US008990626B2

(12) United States Patent
Farchi et al.

(10) Patent No.: US 8,990,626 B2
(45) Date of Patent: Mar. 24, 2015

(54) METHOD AND APPARATUS FOR DETERMINING RELEVANCE OF ASSIGNMENTS IN COMBINATORIAL MODELS

(71) Applicant: International Business Machines Corporation, Armonk, NY (US)

(72) Inventors: Eitan D Farchi, Pardes Hana (IL); Itai Segall, Tel-Aviv (IL); Rachel Yosef Tzoref-Brill, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/716,219

(22) Filed: Dec. 17, 2012

(65) Prior Publication Data
US 2014/0173349 A1 Jun. 19, 2014

(51) Int. Cl.
*G06F 11/00* (2006.01)
(52) U.S. Cl.
CPC .................................. *G06F 11/008* (2013.01)
USPC ............................................ 714/37; 714/33
(58) Field of Classification Search
CPC .................................................. G06F 11/0778
USPC ............................................ 714/37, 38.1, 39
See application file for complete search history.

(56) References Cited

U.S. PATENT DOCUMENTS

| 6,577,982 | B1 | 6/2003 | Erb |
| 7,886,272 | B1 | 2/2011 | Episkopos et al. |
| 8,595,676 | B2 * | 11/2013 | Tzoref-Brill et al. ......... 716/136 |
| 2008/0092098 | A1 * | 4/2008 | Jacobi et al. ..................... 716/5 |
| 2010/0274520 | A1 | 10/2010 | Ur et al. |
| 2010/0275062 | A1 | 10/2010 | Ur |

OTHER PUBLICATIONS

Segall et al., "Simplified Modeling of Combinatorial Test Spaces", 2012 IEEE Fifth International Conference on Software Testing, Verification and Validation (ICST), pp. 573-579, Apr. 2012.
Adler et al., "Evaluating workloads using comparative functional coverage", International Journal on Software Tools for Technology Transfer (STTT), vol. 13, No. 3, pp. 207-221, 2011.
Li et al., "Combinatorial test cases with constraints in software systems", 2012 IEEE 16th International Conference on Computer Supported Cooperative Work in Design (CSCWD), pp. 195-199, May 2012.

* cited by examiner

*Primary Examiner* — Dieu-Minh Le
(74) *Attorney, Agent, or Firm* — Ziu Glazberg

(57) ABSTRACT

An apparatus and computer-implemented method for determining relevance of assignments in combinatorial models, the method comprising: receiving an attribute collection, the attribute collection comprising one or more attributes and one or more possible values for each of attributes; receiving pone or more restrictions, each restriction indicating one or more values for one or more attributes; receiving one or more assignments comprising one or more assigned values for one or more of the attributes; and determining whether the assignment is legal, illegal or partially-legal, wherein an illegal assignment is an assignment which violates a constraint by itself; a legal assignment is an assignment which is not illegal, and for every extension thereof which is illegal, a combination of values assigned to other attributes violates a constraint by itself; and a partially-legal assignment is an assignment which is neither legal nor illegal.

17 Claims, 3 Drawing Sheets

METHOD AND APPARATUS FOR DETERMINING RELEVANCE OF ASSIGNMENTS IN COMBINATORIAL MODELS

TECHNICAL FIELD

The present disclosure relates to testing in general, and to a method and apparatus for determining relevance of assignments in combinatorial models, in particular.

BACKGROUND

Computerized devices control almost every aspect of our life—from writing documents to controlling traffic lights. However, computerized systems are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized system. Additionally, a bug in hardware or firmware of a marketed product may be expensive to fix, as patching it requires call-back of the computerized device. Hence, many developers of computerized systems invest a substantial portion of the development cycle to discover erroneous behaviors of the computerized device.

An important part of testing relates to test planning and design, i.e., providing a set of tests that adequately cover the system, such that if all tests pass the system is assumed to be operative. However, it is generally required to increase testing efficiency and reduce the number or total cost of the tests as much as possible.

A common methodology for test planning and design comprises the usage of combinatorial models, also referred to as Cartesian-product models, which may be used when describing a problem as a set of attributes or properties, values corresponding to the attributes, and restrictions on values or combinations of values that may not appear together in a test. Each test comprises a value for each attribute, such that the combination represents a particular situation. Thus, a test may be represented as a tuple in which every attribute is assigned a value. The model thus spans a space of valid tests, being the value assignments that do not violate any restrictions.

Combinatorial models may have several usages, one of which may be as the input to Combinatorial Test Design (CTD), a test planning technique that selects a subset of the valid test space which covers all interactions up to a certain level, which may be user-defined. Another important usage is for analysis of functional coverage of systems.

One obstacle of CTD deployment lies in correctly capturing the restrictions. Under-restricting the model yields impossible tests, i.e., tests that cannot be executed, and eventually coverage gaps may occur if these tests are skipped or manually modified. Over-restricting, on the other hand, also yields coverage gaps in areas that are wrongfully restricted.

BRIEF SUMMARY

One aspect of the disclosure relates to a computer-implemented method performed by a computerized device, comprising: receiving an attribute collection, the attribute collection comprising one or more attributes and one or more possible values for each of attributes; receiving pone or more restrictions, each restriction indicating one or more values for one or more attributes; receiving one or more assignments comprising one or more assigned values for one or more of the attributes; and determining whether the assignment is legal, illegal or partially-legal, wherein an illegal assignment is an assignment which violates a constraint by itself; a legal assignment is an assignment which is not illegal, and for every extension thereof which is illegal, a combination of values assigned to other attributes violates a constraint by itself; and a partially-legal assignment is an assignment which is neither legal nor illegal.

Another aspect of the disclosure relates to an apparatus having a processing unit and a storage device, the apparatus comprising: an attribute and value receiving component, for receiving an attribute collection, the attribute collection comprising one or more attributes and one or more possible values for each attribute; a restriction receiving component for receiving one or more restrictions, each restriction indicating one or more values for one or more attributes; an assignment receiving component for receiving an assignment comprising an assigned value for one or more attributes; and a legal status determination component for determining a whether the assignment is legal, illegal or partially-legal, wherein an illegal assignment is an assignment which violates at least one restriction by itself; a legal value assignment is an assignment which is not illegal, and for every extension thereof which is illegal, a combination of values assigned to another attribute violates a restriction by itself; and a partially-legal assignment is an assignment which is neither legal nor illegal.

Yet another aspect of the disclosure relates to a computer program product comprising: a non-transitory computer readable medium; a first program instruction for receiving an attribute collection, the attribute collection comprising one or more attributes and one or more possible values for each attribute; a second program instruction for receiving one or more restrictions, each restriction indicating one or more values for one or more attributes; a third program instruction for receiving an assignment comprising an assigned value for at least one of the attributes; and a fourth program instruction for determining whether the assignment is legal, illegal or partially-legal, wherein an illegal assignment is an assignment which violates one or more restrictions by itself; a legal assignment is an assignment which is not illegal, and for every extension thereof which is illegal, a combination of values assigned to other attributes violates a restriction by itself; and a partially-legal assignment is an assignment which is neither legal nor illegal, and wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
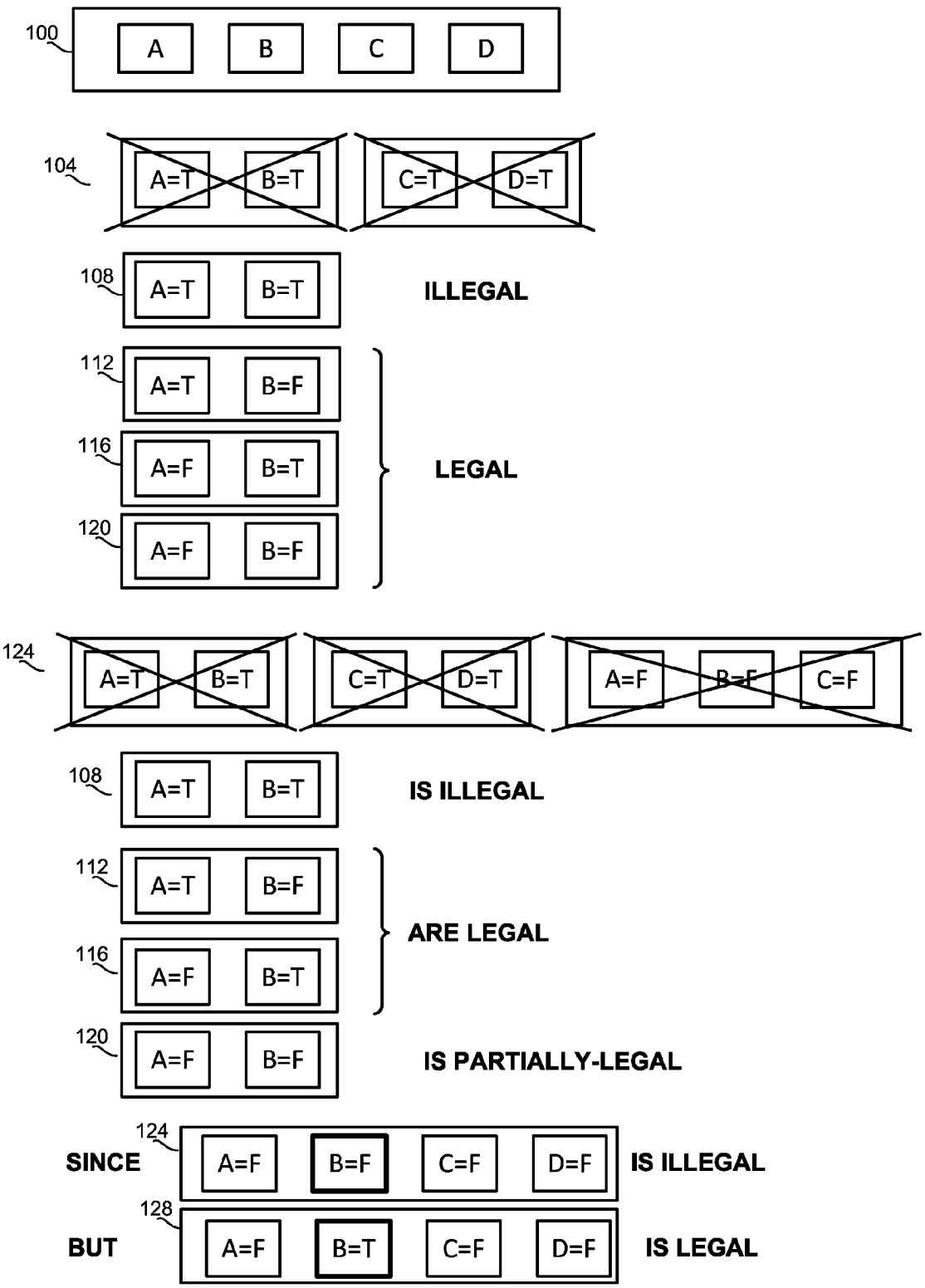
FIG. 1 shows an example of an attribute collection, restriction sets and different legality states, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter relates to deploying CTD, and in particular correctly capturing the restrictions, i.e., determining a restriction set which does neither under-restrict nor over-restrict the model. Consider for example testing various computing platforms with various operating systems and various applications. Under-restricting the model may create impossible tests, for example generating a test comprising an incompatible combination of computing platform and operating system. Such under restriction may eventually create coverage gaps since such tests may be skipped or modified. Over-restricting also yields coverage gaps in areas that are wrongfully restricted, for example testing only combinations containing some operating systems and not others.

One known technique used for effective reviewing of the restrictions in a model is that of the Cartesian product view. In this view, a user may request to see all assignments of a value or value combinations of at least some of the attributes, along with an indication for each such assignment whether it is legal or not. Using this technique, an assignment of values is legal if all tests comprising the values of the assignment (and relevant values for the other attributes) are legal, i.e. violate no restriction; an assignment is illegal of all tests comprising the relevant values for the test are illegal, i.e., violate at least one restriction; and an assignment is partially-legal if there is at least one test comprising the assignment values which is legal, and at least one which is illegal.

In the disclosure below, an assignment comprising two or more values may be referred to as a combination.

For example, a model may comprise four Boolean attributes: A, B, C and D, and restrictions that exclude the combinations of (A=T, B=T) and (C=T, D=T). When looking at the Cartesian product for attributes A and B, the combination A=T, B=T would be marked illegal, and all other combinations would be marked partially-legal, since there exist a legal extension (for example with C=F) and an illegal extension for them (for example with C=T and D=T). An extension refers to value assignment to the rest of the variables not included in the attribute set, to create a complete value set. Such value set may represent a test. If a restriction exists that further excludes (A=F, B=F, C=F), the Cartesian product view for A and B would not change.

However, when using this technique almost all assignments or combinations are either illegal or partially-legal, which provide very little information.

One technical solution comprises effective review of the model, in which the set of non-illegal assignments is divided in an informative way that demonstrates the "role" of the assignments in the restrictions. Thus, all assignments which are not illegal, i.e., do not violate any restriction by themselves, are divided to assignments that are irrelevant for determining whether a test is excluded and are thus legal, and assignments that are relevant and are thus partially-legal.

An assignments is legal if it is not excluded by the restrictions i.e., it is not illegal, and for every illegal extension thereof, the added part, i.e., the assignment of the added attribute values, is excluded by itself. Thus, legal assignments are irrelevant for determining that a test is illegal, since the source of the illegality is in the other attributes.

An assignment of values is partially-legal, i.e., relevant, if it is part of an excluded assignment, wherein the illegality can be removed by changing one or more of the values in the set.

Another technical solution relates to displaying to a user the legality status of an assignment, and an explanation of why an assignment is illegal or partially-legal, for example by presenting an illegal complete value set comprising the values, which may become legal by changing one or more values of the assignment.

Yet another technical solution refers to suggesting to a user a subset of attributes, for example suggesting a small subset of attributes for which no combination is partially-legal. Small subsets may comprise, for example, between about two (2) and about five (5) attributes, but subsets of any other size can also be suggested.

One technical effect of utilizing the disclosed subject matter is the demonstration to a user of the status of a value combination, whether it is legal, partially-legal or illegal. If the combination is illegal, a violated restriction may be presented. If the combination is partially-legal, there may be presented a full combination of values for all attributes which is illegal, and a possible value change for one of the attributes of the assignment which makes the full combination legal.

Yet another technical effect of the disclosure relates to suggesting to a user one or more assignment which are valid, one or more assignments which are illegal, or one or more assignments which are partially-legal.

Referring now to FIG. 1, showing an example of an attribute collection, restriction set and legality statuses of different assignments, relating to a system under test. The system may be any apparatus, such as a software system, a hardware system, a machine, or the like in any domain such as computers, machines, healthcare, finance, education or others, and the disclosure may be used for unit testing, module testing, or testing a full system.

The exemplary system has four Boolean attributes, A, B, C and D, as shown in element 100.

The system has two restrictions 104: it is forbidden that A and B will both be T (True), and also forbidden that C and D will both be T.

Thus, assignment 108 of A=T and B=T is illegal since it violates the first restriction.

All the other combinations, which include combination 112 of A=T and B=F, combination 116 of A=F and B=T, and combination 120 of A=F and B=F are legal. The combinations are legal since they do not violate any restriction in themselves, and in addition no matter which extension will be used, i.e., which values are assigned to C and D, even if such extension violates any restriction, it is not due to the values of A and B, and therefore cannot be fixed by replacing the value of A or B.

In another example, an extended restriction set 124 may be used, which may include an additional restriction of A=F, B=F, and C=F.

Under extended restriction set 124 combination 108 of A=T and B=T is still illegal since it violates the same restriction as before.

Combinations 112 of A=T and B=F and combination 116 of A=F and B=T are still legal since they do not violate any restriction in themselves, and in addition no matter which extension will be used, i.e., which values are assigned to C and D, even if such extension violates any restriction, it is not due to the values of A and B, and therefore cannot be fixed by replacing the value of A or B.

However, combination 120 of A=F and B=F is now partially-legal, since an extension 124 of A=F, B=F, C=F and D=F is illegal since it violates the restriction of A=F, B=F, and C=F. However, replacing the value of B with T yields combination 128 of A=F, B=T, C=F and D=F which does not violate any restriction and is thus legal.

The assignment may thus be defined formally as follows: let A be the set of all attributes. An assignment S to a set of attributes B is legal if the set of non-illegal assignments to A-B equals the set of legal extensions of S to A. An assignment S to B is partially-legal if it is not legal neither illegal.

Figure 2:
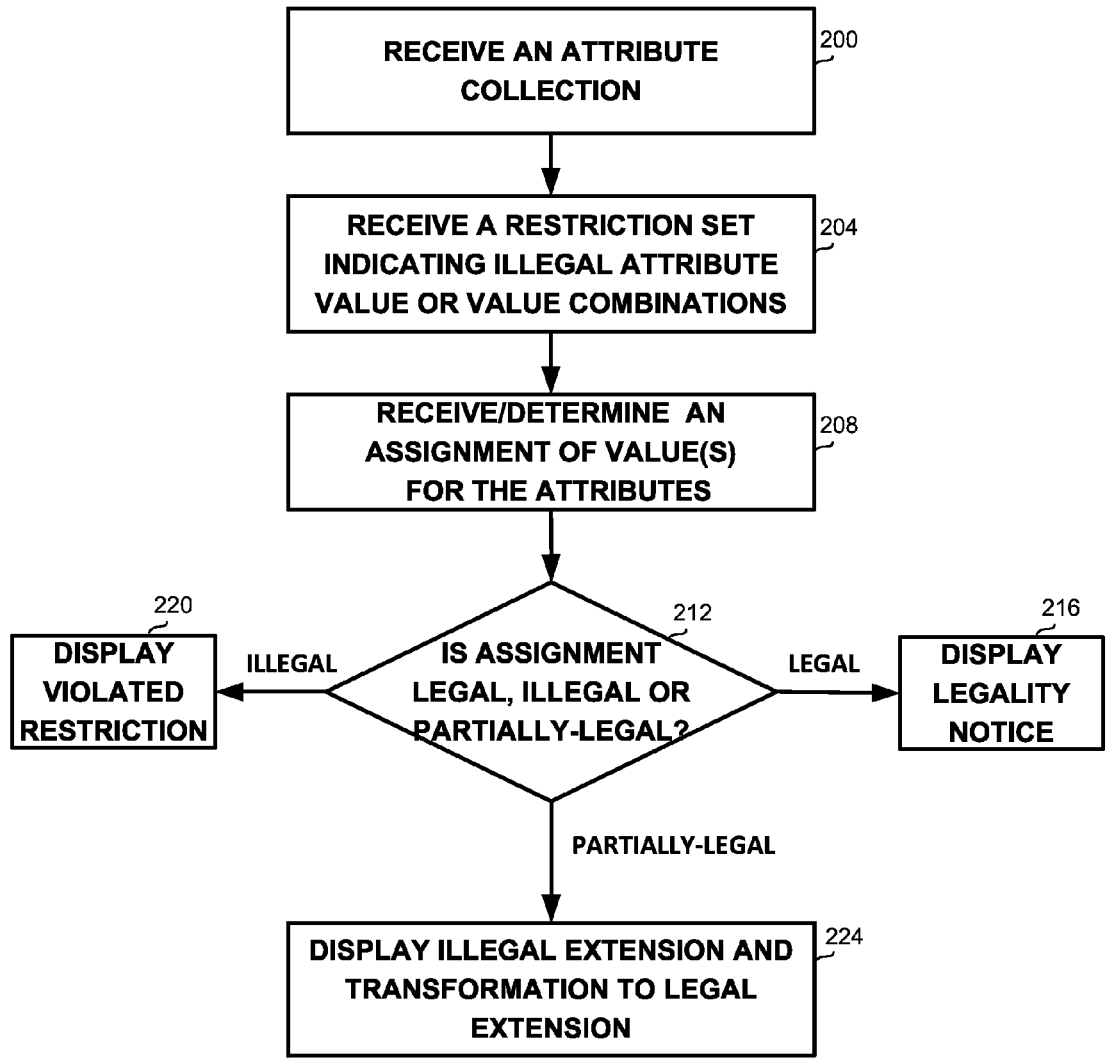
FIG. 2 shows a flowchart diagram of steps in a method for determining and presenting legality status of value assignments, in accordance with some exemplary embodiments of the disclosed subject matter.

Referring now to FIG. 2, showing a flowchart diagram of steps in a method for determining and presenting legality status.

On step 200, an attribute collection associated with a domain or a system may be received. Each attribute may be associated with a name or an indicator, and a set of possible values. It will be appreciated that in some embodiments the attribute collection may comprise at least two attributes, wherein each attribute may be associated with at least two possible values.

On step 204, a restriction set may be received, indicating a restriction collection, comprising one or more illegal or forbidden value or value combinations of particular attributes. Thus, each restriction comprises one or more forbidden values for an attribute, or a forbidden combination of at least a first value for a first attribute and a second value for a second attribute. It will be appreciated that a restriction may comprise any number of values for any number of attributes. It will also be appreciated that a restriction comprising one forbidden value may sometimes be used for purposes such as documentation, code debug or others.

On step 208, an assignment comprising a value or value combination for attributes may be received from any source such as a user, a file, or the like, or determined randomly, systematically, or the like. The assignments may refer to any subset of the attributes, between very few attributes such as 2-5 and the full attribute set.

On step 212 the legality of the assignment is assessed, i.e., whether the assignment is legal i.e., does not violate any restriction, and all violations of extensions cannot be cured by changing a value of the tested combination; whether it is illegal, i.e., violates a restriction; or partially legal, i.e., it is not illegal and there exists an extension that violates a restriction and may be cured by changing one or more of the values in the assignment.

This assessment may be performed by any method, for example by Binary Decision Diagrams (BDDs) as described for example in "Using Binary Decision Diagrams for Combinatorial Test Design" by Segall et al., published at ISSTA '11, Jul. 17-21, 2011, Toronto, ON, Canada, incorporated herein by reference in its entirety.

If the assignment is legal, then on step 216 it may be displayed as such, for example with a legality notice.

If the assignment is illegal, then on step 220 it may be displayed as illegal, e.g., with an illegality notice and an indication of one or more violated restrictions.

If the assignment is partially-legal then on step 224 it may be displayed as such, optionally with an explanation for its status. The explanation may comprise an extension, an indication of a restriction violated by the extension, and replacement values for one or more attributes of the assignment, which when used cause the extension to be legal, i.e., not to violate any restriction. Alternatively, the explanation may comprise a multiplicity or all of illegal extensions of the assignment. It will be appreciated that other explanations may be suggested as well.

In some embodiments, the method may receive a request to suggest an assignment which is legal, illegal or partially-legal, and if the assignment is illegal or partially-legal to display the assignment optionally with a violated restriction or combination of restrictions, or a violated restriction and replacement value, respectively. The assignment may then be determined, received from the determination component on step 208 and assessed whether it is indeed legal, illegal or partially-legal as requested.

In some embodiments, a user may request to review a set of assignments or the entire Cartesian product of values for a subset of the attributes.

Figure 3:
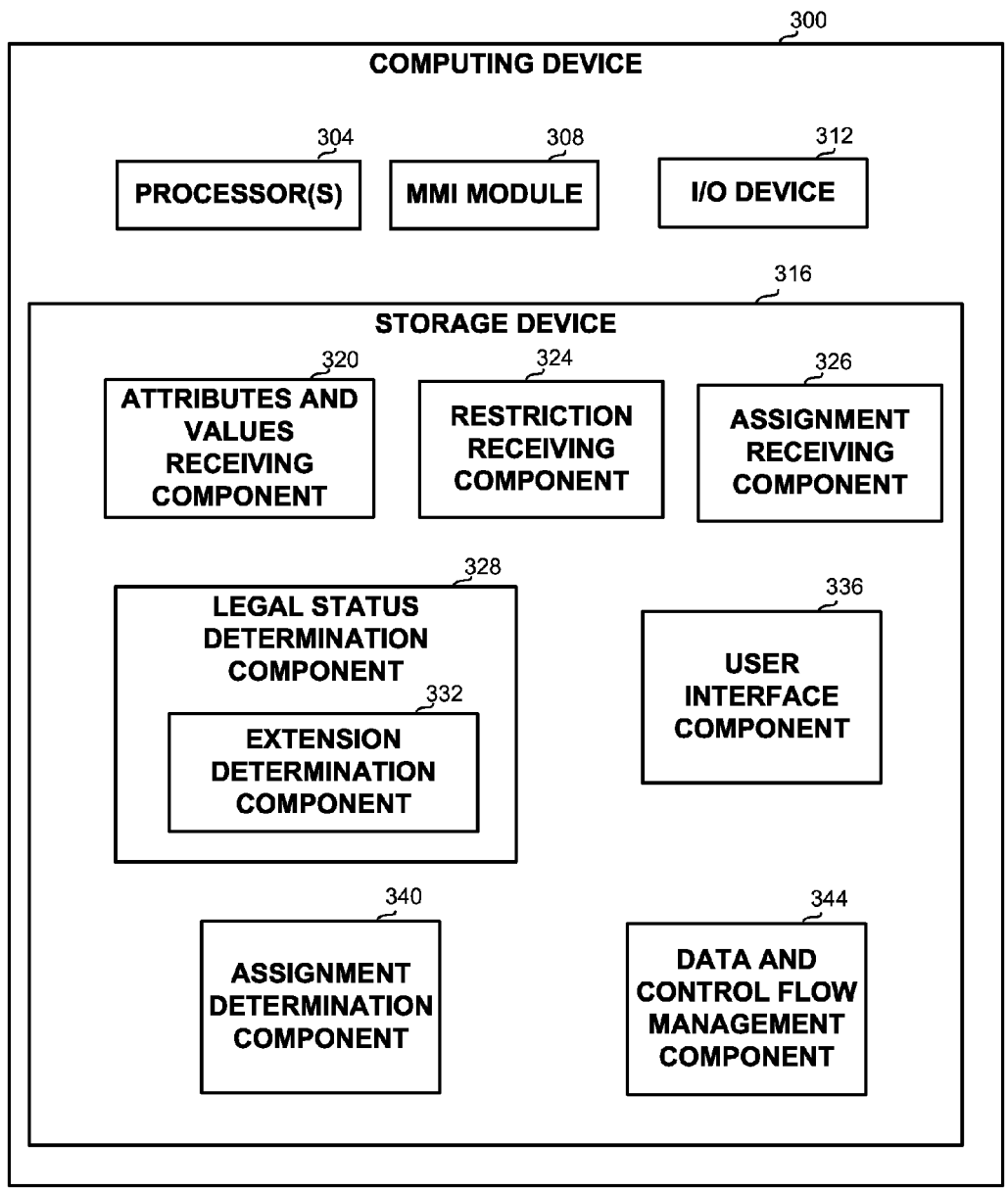
FIG. 3 shows a block diagram of components of an apparatus for determining and presenting legality status of value assignments, in accordance with some exemplary embodiments of the disclosed subject matter.

Referring now to FIG. 3, showing a block diagram of components of an apparatus for determining and presenting legality status.

The apparatus may comprise a computing platform 300. Computing platform 300 may comprise a processor 304. Processor 304 may be a Central Processing Unit (CPU), a microprocessor, an electronic circuit, an Integrated Circuit (IC) or the like. Alternatively, computing platform 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 304 may be utilized to perform computations required by computing platform 300 or any of it subcomponents.

In some exemplary embodiments of the disclosed subject matter, computing platform 300 may comprise MMI module 308. MMI module 308 may be utilized to provide communication between the apparatus and a user, for providing input such as the attributes, possible values and restrictions, receiving output such as assignments and their legality status, or the like.

In some embodiments, computing platform 300 may comprise an input-output (I/O) device 312 such as a terminal, a display, a keyboard, an input device or the like, used to interact with the system, to invoke the system and to receive results.

In some exemplary embodiments, computing platform 300 may comprise one or more storage devices such as storage device 316. Storage device 316 may be persistent or volatile. For example, storage device 316 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 316 may retain program code operative to cause processor 304 to perform acts associated with any of the steps shown in FIG. 2 above, for example receiving attributes and restrictions, checking their legality status, or the like.

The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 316 may comprise an attribute and value receiving component 320 for receiving input, including for example the attribute set of the system to be tested, possible values for each attribute, or additional data. The input may be received via a network, computer communication using any protocol, an external storage device, retrieved from a database, or the like.

Storage device 316 may also comprise a restriction receiving component 324 for receiving the restrictions, i.e., the unacceptable value combinations, or additional data. The input may be received via a network, computer communication using any protocol, an external storage device, retrieved from a database, or the like.

Storage device 316 may also comprise assignment receiving component 326 for receiving an assignment of at least one attribute, for assessing the legal status of the assignment.

Yet another component of storage device 316 may be legal status determination component 328, which may receive a value assignment for one or more attributes, may use extension determination component 332 for determining values for other attributes, and may determine the legality status of the assignment, using for example a BDD engine.

Storage device 316 may also comprise user interface component 336 for receiving input or requests from a user, for example receiving a value combination, receiving a request for generating an assignment which is legal, illegal or partially-legal, or the like Storage device 316 may further comprise assignment determination component 340 for determining value or value combinations, whether systematically, randomly or in any other manner.

Yet another component of storage device 316 may be data and control flow management component 344 for managing the flow of information and control between other components, for example storing the attributes, values and restrictions received by attribute and value receiving component 320 and by restriction receiving component 324, determining assignments by combination determination component 340, determining assignment status by status determination component 328, or the like.

It will be appreciated that multiple enhancements and modifications may exist to the method and apparatus.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    receiving an attribute collection, the attribute collection comprising at least one attribute and at least one possible value for each of the at least one attribute;
    receiving at least one restriction, the at least one restriction indicating at least one value for at least one attribute;
    receiving an assignment comprising an assigned value for at least one of the at least one attribute; and
    determining whether the assignment is legal, illegal or partially-legal,
    wherein an illegal assignment is an assignment which violates at least one restriction by itself; a legal assignment is an assignment which is not illegal, and for every extension thereof which is illegal, a combination of values assigned to attributes other than the at least one attribute violates a restriction by itself; and a partially-legal assignment is an assignment which is neither legal nor illegal.

2. The computer-implemented method of claim 1, wherein determining whether the assignment is legal, illegal or partially-legal is performed using a Binary Decision Diagram.

3. The computer-implemented method of claim 1, further comprising displaying the assignment and a legal status thereof.

4. The computer-implemented method of claim 3, further comprising displaying a violated restriction or restriction combination for an illegal assignment.

5. The computer-implemented method of claim 3, further comprising displaying for a partially-legal assignment an explanation why it is partially legal.

6. The computer-implemented method of claim 5, wherein the explanation comprises an extension, a violated restriction and a value change for the assignment which makes the extension legal.

7. The computer-implemented method of claim 5, wherein the explanation comprises a multiplicity of illegal extensions.

8. The computer-implemented method of claim 1, further comprising determining the value combination.

9. An apparatus having a processing unit and a storage device, the apparatus comprising:
    an attribute and value receiving component, for receiving an attribute collection, the attribute collection comprising at least one attribute and at least one possible value for each of the at least one attribute;
    a restriction receiving component for receiving at least one restriction, the at least one restriction indicating at least one value for at least one attribute;
    an assignment receiving component for receiving an assignment comprising an assigned value for at least one of the at least one attribute; and
    a legal status determination component for determining a whether the assignment is legal, illegal or partially-legal,
    wherein an illegal assignment is an assignment which violates at least one restriction by itself; a legal value assignment is an assignment which is not illegal, and for every extension thereof which is illegal, a combination of values assigned to attributes other than the at least one attribute violates a restriction by itself; and a partially-legal assignment is an assignment which is neither legal nor illegal.

10. The apparatus of claim 9, wherein the legal status determination component comprises a Binary Decision Diagram engine.

11. The apparatus of claim 9, further comprising a user interface for displaying the assignment and a legal status thereof.

12. The apparatus of claim 11, wherein the user interface is adapted to display for a partially-legal assignment an explanation why it is partially legal.

13. The apparatus of claim 12, wherein the explanation comprises an extension, a violated restriction and a value change for the assignment which makes the extension legal.

14. The apparatus of claim 12, wherein the explanation comprises a multiplicity of illegal extensions.

15. The apparatus of claim 11, wherein the user interface is adapted to display for an illegal assignment a restriction violated by the assignment.

16. The apparatus of claim 9, further comprising an assignment determination component for determining the assignment.

17. A computer program product comprising:
    a non-transitory computer readable medium;
    a first program instruction for receiving an attribute collection, the attribute collection comprising at least one attribute and at least one possible value for each of the at least one attribute;

a second program instruction for receiving at least one restriction, the at least one restriction indicating at least one value for at least one attribute;

a third program instruction for receiving an assignment comprising an assigned value for at least one of the at least one attribute; and a fourth program instruction for determining whether the assignment is legal, illegal or partially-legal, wherein an illegal assignment is an assignment which violates at least one restriction by itself; a legal assignment is an assignment which is not illegal, and for every extension thereof which is illegal, a combination of values assigned to attributes other than the at least one attribute violates a restriction by itself; and a partially-legal assignment is an assignment which is neither legal nor illegal, and wherein said first, second, third and fourth program instructions are stored on said non-transitory computer readable medium.

* * * * *